Nov. 1, 1949
W. R. FISH
2,486,938
MANUFACTURE OF FATTY ACID ESTERS
Filed Jan. 22, 1947
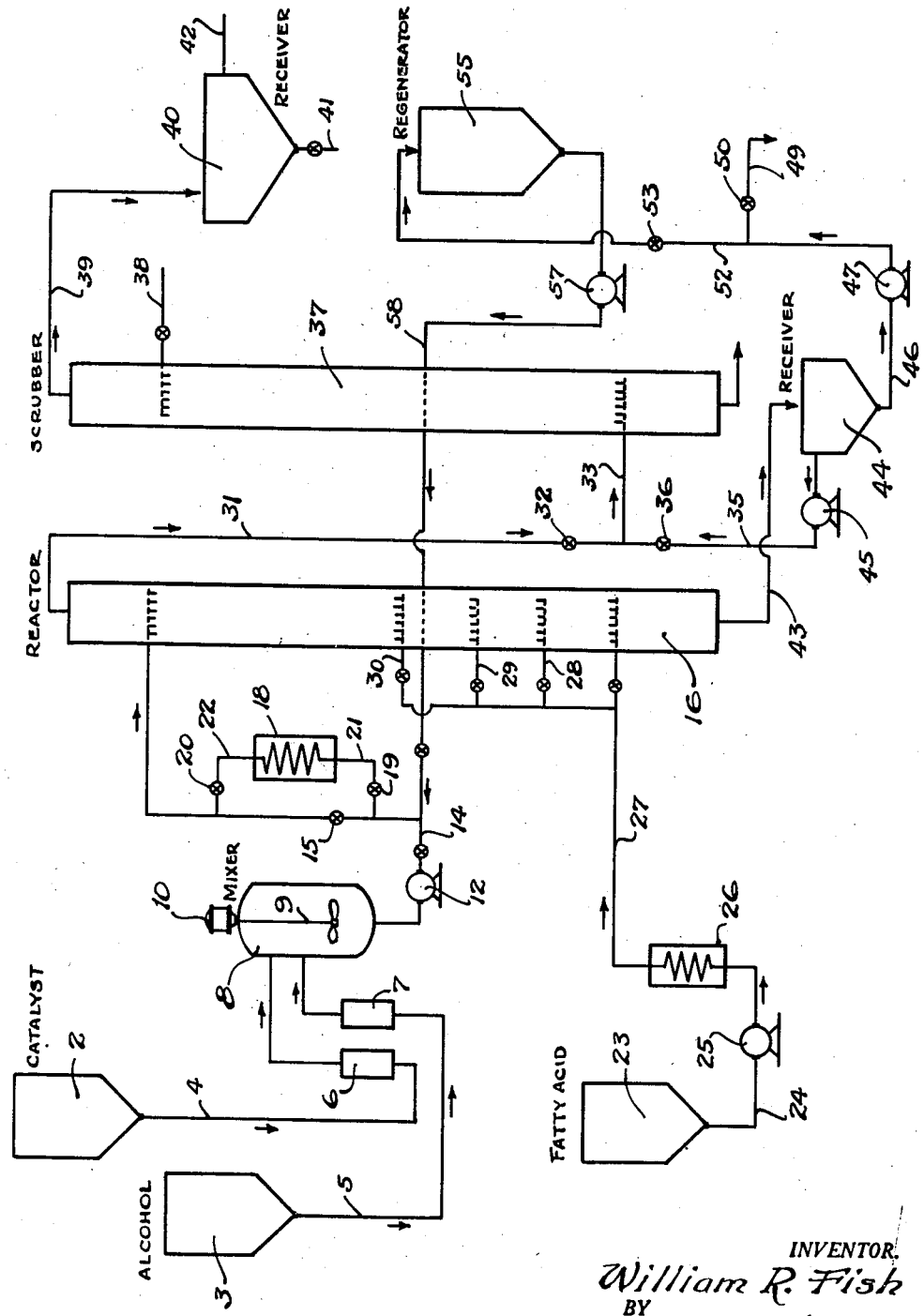
INVENTOR.
William R. Fish
BY
R. G. Story
ATTORNEY Patented Nov. 1, 1949

2,486,938

UNITED STATES PATENT OFFICE 2,486,938

MANUFACTURE OF FATTY ACID ESTERS

William R. Fish, Inyokern, Calif., assignor to Swift & Company, Chicago, Ill., a corporation of Illinois Application January 22, 1947, Serial No. 723,557

10 Claims. (Cl. 260—410.9)

The present invention relates to the manufacture of esters. More particularly, the invention has to do with a method of synthesizing esters from fatty acids and low molecular weight alcohols.

Heretofore, the esterification of fatty acids and alcohols has been accomplished batchwise by heating the acid with an alcohol in the presence of a small amount of catalyst, such as sulfuric acid. After completion of the reaction, the ester is isolated from the reaction mixture, is washed with water, and may be further purified by distillation.

An object of the invention is to provide a method for the continuous synthesis of esters.

Another object of the invention is to provide a continuous countercurrent method of esterification.

A further object of the invention is to provide a method of esterification whereby the reaction time is shortended.

Yet another object of the invention is to provide a method whereby relatively pure esters may be obtained.

Other objects and advantages will be apparent from a description of the invention given below.

It is contemplated by the present invention to effect the continuous esterification of fatty acids with low molecular weight alcohols by a process wherein the acid to be esterified is substantially insoluble in a mixture of alcohol and catalyst and also the ester product is substantially insoluble in the catalyst-alcohol solution. An alcohol-catalyst mixture is employed which bears such a density relationship to the fatty acid and the ester product that a countercurrent operation is possible.

More particularly, according to the invention the fatty acid to be esterified is continuously introduced into a reaction zone, such as a tower, countercurrent to the introduction therein of a mixture of alcohol and strong mineral acid, the mixture having such proportions of alcohol and mineral acid that the fatty acid is substantially insoluble therein. The fatty acid, as a separate liquid phase, passes through thhe acid-alcohol mixture, and thereby reacts with the alcohol to form the ester, which accumulates as a separate phase. The ester phase is continuously withdrawn, washed and collected. The acidic alcohol is also continuously withdrawn, regenerated and recycled to the system.

In order better to understand the invention, reference is made to one form of drawing, which diagrammatically shows apparatus that may be suitably employed in carrying out the invention.

Referring to the drawing, the numeral 2 indicates a tank for holding the catalyst, for example, a mineral acid, such as sulfuric acid. Another tank 3 is provided for holding a suitable esterifying alcohol, such as methanol. The catalyst and alcohol are withdrawn through lines 4 and 5, respectively, each line being provided with suitable means, such as metering orifices, as indicated at 6 and 7, to properly proportion the ingredients. The alcohol and catalyst are introduced into mixing vessel 8 which is preferably closed and is provided with suitable means, such as an agitator 9, driven by motor 10, to effect intimate mixture of the contents. The mixture of alcohol and acid may be pumped from the tank 8 by means of pump 12 through line 14 by suitable control of valve 15 into a countercurrent esterification tower 16. In the event it is desired to preheat the acid and alcohol, the mixture thereof may be conducted through preheater 18 by suitable control of valves 19 and 20 in lines 21 and 22. Tower 16 is preferably jacketed so as to better control the temperatures therein.

The fatty acid to be esterified is continuously withdrawn from supply tank 23 through line 24 by means of pump 25. The fatty acid may be preheated in preheater 26, and then passed through line 27 and into tower 16. The acid may be introduced into tower 16 at different levels through lines 28, 29 and 30, according to the length of residence of the fatty acid required in the tower, which depends on the nature of the reaction, the temperature and the properties of the reactants.

The fatty acid moves countercurrent to the descending alcohol and the fatty acid and alcohol undergoing esterification. The resulting ester accumulates at the top of the tower and may be withdrawn by means of line 31 by suitable control of valve 32. The ester withdrawn from tower 16 may be continuously charged through inlet line 33 to a second tower 37 near the bottom thereof. In the tower 37 the ester is scrubbed or washed, for example, with water introduced through line 38. The washed ester is conducted from tower 37 through line 39 to settling tank 40. The ester is separated from entrained water in tank 40 and may be withdrawn through line 42, the water settling to the bottom and being withdrawn through line 41.

The spent catalyst-alcohol solution is conducted from tower 16 through line 43 to settling tank 44, wherein entrained ester product is allowed to separate. Such ester product is forced by pump 45 into scrubbing tower 37 through lines 35 and 33 by suitable control of valve 36. The ester-free alcohol-catalyst solution is removed from settling tank 44 through line 46 by means of pump 47 and all of the mixture or a portion thereof may be removed from the system through drain 49 by suitable control of valve 50. Any desired amount of the used mixture of catalyst and alcohol may be charged through line 52 by suitable control of valve 53 to treating tank 55.

In treating tank 55 the solution of mineral acid and alcohol is regenerated, for example, by the removal of water and fortification with catalyst and alcohol. The regenerated catalyst-alcohol solution may then be recycled to the system by means of pump 57 through line 58.

The density of the alcohol-catalyst mixture is usually greater than that of the fatty acid, and, therefore, the mixture of alcohol and catalyst is introduced into the upper portion of the reaction tower, while the fatty acid is introduced into the bottom portion. When it is desired to operate under a reverse density relationship, it is understood that the points of injection into the tower of the reactants will also be reversed, in which case the ester is withdrawn from the bottom of the tower and spent catalyst-alcohol mixture from the top.

The organic acid feed rate is adjusted in accordance with the size and construction of the tower. The alcohol-catalyst mixture is fed into the tower at a rate in relation to the fatty acid rate which permits maximum utilization of the alcohol and at the same time carries off the water of reaction sufficiently rapidly so as not to unduly depress the rate of ester formation. The excess alcohol-catalyst mixture is discharged from the tower at such a rate as to maintain the level of the ester substantially constant. The ester product, consequently, is removed from the tower at a rate about equal to its rate of accumulation.

It is preferred to employ a packed tower or a tower constructed in such manner as to retard the flow of fatty acid through the acid-alcohol solution, thereby prolonging the time of contact between the reactants. The tower may be packed with such material as Berl saddles, bubble caps, Raschig rings, or other conventional material. The fatty acid is injected into the tower so as to cause the formation of globules of fatty acid which, because of the packing in the tower, repeatedly subdivide and coalesce, or re-form, thus continuously exposing unreacted organic acid to the action of the alcohol.

The ester resulting from the flow of the fatty acid through the acidic alcohol solution accumulates either at the bottom or top of the tower depending upon the density relationship between the acid-alcohol solution and the ester. Thus, when the density of the acid-alcohol solution is greater than that of the ester product formed, the ester as it forms will rise to the top of the column. On the other hand, when the density of the acid-alcohol solution is less than that of the ester product, the ester accumulates at the bottom of the tower. The relationship between the density of fatty acid to acid-alcohol solution is always the same as that existing between the ester phase and the acid-alcohol solution so that the fatty acid introduced into the column flows toward the area of accumulated ester product.

The degree of purity of the ester product depends on a number of factors. For example, the length, construction, and packing of the tower affect the efficiency of the reaction. Although no packing may be employed in the tower, the reaction may be made more efficient by employing a packed tower whereby the surface of the reactants may be increased. Moreover, the degree of purity of the ester product is affected by the reaction temperatures employed. Generally, the higher the temperature the more complete the reaction between the reactants for a given period of time. Another factor affecting the degree of purity of the ester product is the composition of the alcohol-catalyst mixture. For example, if the concentration of the catalyst is increased, within limits, the more insoluble is the acid-alcohol mixture in the ester product.

An additional factor in producing a pure product resides in the proportion of acid alcohol mixture to fatty acid. It is preferred to employ an excess of alcohol over fatty acid in order to shift the reaction equilibrium in favor of the formation of ester.

After completion of the reaction, the ester product is withdrawn from the tower and may be further purified, for example, by charging the ester to a second tower wherein it is scrubbed with water to remove water-soluble impurities, such as the catalyst used in the reaction. If desired, the second tower may be packed to increase the efficiency of the washing action. The ester product may be removed to a settling tank wherein the ester is separated from the entrained water. If desired, the product may be further purified by distillation.

The acid-alcohol mixture, together with the water of reaction, is removed from the tower and introduced into a settling tank wherein a separation of the ester from the mixture is effected. The ester recovered from this settling operation may be treated to purify it, as hereinabove described, while the spent acid-alcohol solution may be treated to remove water and readjust the proportions of alcohol and catalyst. The regenerated alcohol-catalyst solution may then be recycled to the reaction tower.

The removal of water from the alcohol-catalyst discharge may be effected by chemical or physical means, as for instance, by treating the mixture with dimethyl sulfate or anhydrous inorganic salts, such as sodium sulfate and calcium chloride. To prevent the accumulation of excessive quantities of undesirable materials, such as decomposition products, part of the spent acid alcohol solution is advantageously discarded, and is replaced by suitable amounts of fresh alcohol and catalyst. The regenerated alcohol-catalyst mixture may then be recycled to the system.

The alcohol-catalyst solution is preferably prepared just prior to use by mixing the alcohol and catalyst from separate sources, thereby utilizing the heat of solution of the ingredients. If desired, the mixture may be preheated before charging it to the reaction tower. The fatty acid is charged to the other end of the tower, preferably after preheating it.

I have found that the esterification reaction may be advantageously carried out by employing ratios of fatty acid to alcohol-catalyst mixture of about ½ to 1 to about 1½ to 1 by weight, a ratio of 1 to 1 being satisfactory. In forming the solution of catalyst and alcohol, a sufficient amount of a strong mineral acid is employed to decrease substantially the solvent action of the alcohol for the fatty acid and the ester, yet insufficient to substantially dissolve the ester and fatty acid. In addition, the amount of catalytic acid is such as to effect a solution having a density differing from that of the ester and fatty acid, so that the solution of catalyst and alcohol flows countercurrent to the flow of fatty acid and ester. In forming the solution of alcohol and catalyst, such as sulfuric acid, it is preferred to employ concentrated sulfuric acid. An acid solution having a concentration from about 94 per cent to about 98 per cent is suitable, 98 per cent sulfuric acid being preferred. If the catalyst is of lower concentration, the presence of water impedes the formation of ester, and the reaction will be retarded. On the other hand a too highly concentrated acid tends to decompose the alcohol dissolved therein with no appreciable increase in rate of reaction. When the fatty acid is substantially insoluble in the alcohol-catalyst solution the amount of concentrated sulfuric acid contained in the alcohol-catalyst solution ranges from about 10 to 30 per cent by weight. The presence of sulfuric acid in amounts within these limits greatly reduces the solvent action of the alcohol-acid solution for the ester and yet is present in insufficient quantity to show appreciable solvent action for the ester. For other catalysts that may be employed, such as hydrogen chloride and phosphoric acid, the concentration of the acid in the alcohol will vary depending on the power of the acid to impart non-solvent properties to the alcohol but ineffective to have any substantial solvent action for the ester.

Operating temperatures in the column may range from about 40° C. to about 110° C. In general, such temperatures are employed as to promote rapid esterification without causing the alcohol to vaporize within the tower. The upper limit of the temperature range is in general fixed by the boiling temperature of the catalyst-alcohol mixture and by the pressure under which the tower is maintained. In the case of methyl alcohol, I prefer to use temperatures between 60 and 65° C. at atmospheric pressure. In the event it is desired to employ higher temperatures it is necessary to employ pressure to maintain the methanol in a liquid state.

The temperatures employed in carrying out the esterification reaction may vary over a wide range. The variation in temperatures depends on the nature of the reactants, on the rate of reaction desired, and also on the stability of the reactants. For example, the higher the temperature, the shorter the reaction time but the greater the tendency for the catalyst to decompose the fatty acid, alcohol and ester formed. It is desirable to employ a reaction temperature below the point of decomposition. The lower limit of temperature conditions in the tower is determined chiefly by the nature of the reactants and the rate of reaction desired. For example, the lower the molecular weight of the ester desired, the lower the operating temperatures may be.

There hereindescribed process is applicable to the continuous preparation of esters, or mixtures of esters, which are essentially insoluble in the component alcohol, or mixtures of alcohols, containing a determined amount of acid catalyst; and is applicable to operations using an organic acid, or mixture of organic acids, which is also essentially insoluble in the alcohol, or mixture of alcohols, with which the organic acid or mixture of organic acids is to be esterified and which contains a determined amount of acid catalyst. The fatty acids employed may be the higher saturated and unsaturated aliphatic organic acids and halogen derivatives of the higher saturated and unsaturated aliphatic acids, and mixtures of these acids. Acids of 10 or more carbon atoms in the molecule are preferred. Examples of suitable acids are capric, lauric, myristic, palmitic, oleic, stearic, arachidic, behenic, cerotic, linoleic, erucic, and mixtures of these; tall oil; high fatty acid content greases, etc. I have found that the low molecular weight alcohols, or mixtures thereof, that may be employed are those having not more than 4 carbon atoms in the molecule. These alcohols range from methyl through butyl including the isomers. In the claims, the singular use of "alcohol" and "fatty acid" is intended to cover a mixture of alcohols and a mixture of fatty acids, in which case a final product of mixed esters will be obtained.

In all of the following examples the same tower was employed. This tower was 10 feet high and 2 inches in inside diameter. The lower 7½ feet of its length was packed with ½ inch Berl saddles, and was provided with a full length water jacket.

Example I

Methyl myristate was prepared in the following manner. Anhydrous methanol was mixed with 20 per cent by weight of 98 per cent sulfuric acid and the resulting mixture pumped into the tower at a point 2 feet below the top. The rate of injection of the alcohol-catalyst mixture was 6.1 pounds per hour. At the same time and at an equal rate, myristic acid was pumped into the tower at a point 2 feet above the bottom. A temperature of 60° C. was maintained in the tower. The spent acidic alcohol was withdrawn from the bottom of the tower and the ester product from the top. The latter was introduced into a second tower, wherein it was washed with water and then dried. After 5 hours' operation a quantity of ester product, representing 96.3 per cent of the theoretical yield, was obtained. This product contained 98.3 per cent of methyl myristate.

Example II

Commercial red oil, having an ester content of 4.0 per cent, was introduced into the tower at a point 2 feet above the bottom thereof. The rate of feed was 5.7 pounds of red oil per hour. At the same time anhydrous ethyl alcohol, containing 20 per cent by weight of concentrated sulfuric acid, was introduced into the tower at a point 2 feet below the top thereof at the rate of 7.5 pounds per hour. The ester product collected during a five-hour period from the top of the tower was washed with water and dried. The dry ethyl oleate contained 2.0 per cent free fatty acids and was obtained in a yield 93.4 percent of the theoretical.

Example III

Brown grease, containing 56.5 per cent free fatty acid and from which the fines had been removed, was pumped into the tower at a rate of 6.1 pounds per hour. Anhydrous methanol, containing 20 per cent by weight of concentrated sulfuric acid, was pumped into the tower near the top thereof at a rate of 5.9 pounds per hour. The tower was maintained at 61° C. The ester product was collected, washed and dried, and contained 6.6 per cent free fatty acid.

Obviously, many modifications and variations of the invention, as hereinbefore set forth, may be made without departing from the spirit and scope thereof, and therefore only such limitations should be imposed as are indicated in the appended claims.

I claim:

1. A continuous process for the esterification of higher fatty acids and low molecular weight alcohols which comprises passing a mixture of low molecular weight monohydric alcohol and a strong mineral acid catalyst at esterifying temperatures countercurrent to the fatty acid to be esterified, and maintaining the concentration of catalyst and alcohol such that the ester is insoluble in the alcohol-catalyst mixture whereby the ester product accumulates as a separate liquid phase.

2. A continuous process for the manufacture of esters from higher fatty acids and low molecular weight alcohols which comprises separately introducing into an esterification zone the fatty acid to be esterified and a mixture of a strong mineral acid catalyst and a low molecular weight monohydric alcohol at points substantially removed from each other, the concentration of the catalyst in the alcohol-catalyst mixture being such that the fatty acid and the resulting ester are substantially insoluble in said mixture, subjecting the fatty acid and the alcohol-catalyst mixture to countercurrent contact in said zone at esterifying temperatures, whereby the ester accumulates as a separate liquid phase and withdrawing the ester phase from said zone.

3. A continuous process for the manufacture of esters from fatty acids and low molecular weight alcohols which comprises continuously introducing into a tower a higher fatty acid and a mixture of a strong mineral acid catalyst and a low molecular weight monohydric alcohol at points substantially removed from each other, subjecting the fatty acid and alcohol mixed with the catalyst to countercurrent contact at esterifying temperatures, maintaining the concentration of alcohol and catalyst such that the ester forms as a separate liquid phase, and continuously withdrawing the ester and used catalyst from said zone.

4. A continuous process for the manufacture of esters from fatty acids and low molecular weight alcohols which comprises forming a mixture of a strong mineral acid catalyst and an excess of a low molecular weight monohydric alcohol, introducing said mixture and a higher fatty acid into a tower at points substantially removed from each other, said fatty acid being of sufficiently high molecular weight and the proportion of alcohol and catalyst being such that the ester is insoluble in said alcohol-catalyst mixture, subjecting said mixture and the fatty acid to countercurrent contact at esterifying temperatures whereby the ester and catalyst containing excess alcohol separate into two liquid phases, withdrawing the phases from the tower, and recycling at least a portion of the alcohol-catalyst mixture to the system.

5. A continuous process for the manufacture of esters from fatty acids and alcohols which comprises continuously charging to a reaction zone at esterifying temperatures a low molecular weight monohydric alcohol, a strong mineral weight catalyst and a higher fatty acid, said fatty acid being of sufficiently high molecular weight and the proportion of alcohol and catalyst being such that the ester is insoluble in the alcohol-catalyst mixture, intimately contacting in countercurrent flow said fatty acid in the form of globules with said alcohol and catalyst in the reaction zone, wherein said globules tend to subdivide and re-form, thereby continuously exposing unreacted surface to the action of the alcohol to form an ester, and recovering the ester from the reaction products.

6. A continuous process for the manufacture of esters from fatty acids and low molecular weight alcohols which comprises continuously countercurrently contacting esterifying temperatures a higher fatty acid with a mixture of low molecular weight monohydric alcohol and sufficient strong mineral acid catalyst whereby an ester is formed, maintaining the proportions of alcohol and catalyst such that the resulting ester is substantially insoluble in the catalyst mixture, and said mixture has a density different from that of the fatty acid and ester, whereby the ester forms a separate liquid phase, and recovering said ester phase from the system.

7. A process substantially as described in claim 6 wherein the charge mixture of alcohol and catalyst contains about 10 to 30 per cent by weight of concentrated sulfuric acid.

8. A continuous process for the manufacture of esters from fatty acids and low molecular weight alcohols which comprises forming a mixture of a monohydric alcohol having not more than 4 carbon atoms in the molecule and a strong sulfuric acid catalyst, introducing said mixture and a higher fatty acid into a tower at points substantially removed from each other, subjecting said mixture and fatty acid to countercurrent contact at a temperature within a range from about 40° C. to about 110° C., maintaining a sufficient concentration of the catalyst in the alcohol-catalyst mixture whereby an ester product substantially insoluble in the catalyst mixture is formed and accumulates in a separate liquid phase, and withdrawing the ester from said tower.

9. A continuous process for the manufacture of esters from fatty acids and low molecular weight alcohols which comprises separately charging to a tower a higher fattty acid and a mixture of 94 to 98 per cent sulfuric acid catalyst and a monohydric alcohol having not more than 4 carbon atoms in the molecule, the ratio of alcohol-catalyst mixture to fatty acid being about ½ to 1½ parts by weight of alcohol-catalyst mixture to 1 part of fatty acid, subjecting the alcohol-catalyst mixture and fatty acid to countercurrent contact at esterifying temperatures, whereby an ester product substantially insoluble in the catalyst mixture is formed and withdrawing the ester from said tower.

10. A continuous process for the manufacture of esters from fatty acids and low molecular weight alcohols which comprises forming a mixture of anhydrous methyl alcohol with about 20 per cent by weight of 98 per cent sulfuric acid catalyst, introducing said alcohol-catalyst mixture and higher fatty acid in a ratio by weight of about 1 part alcohol to 1 part fatty acid into a tower, subjecting said mixture and fatty acid to countercurrent contact at a temperature of about 60° C., whereby a methyl ester product substantially insoluble in the catalyst mixture is formed and accumulates in a separate liquid phase, and withdrawing the ester from said tower.

WILLIAM R. FISH.

REFERENCES CITED

The following references are of record in the file of this patent:

UNITED STATES PATENTS

| Number | Name | Date |
| --- | --- | --- |
| 1,881,563 | Held et al. | Oct. 11, 1932 |
| 2,166,812 | Gayer et al. | July 18, 1939 |

FOREIGN PATENTS

| Number | Country | Date |
| --- | --- | --- |
| 356,276 | Great Britain | Oct. 6, 1930 |

Certificate of Correction

Patent No. 2,486,938 November 1, 1949

WILLIAM R. FISH

It is hereby certified that errors appear in the printed specification of the above numbered patent requiring correction as follows:

Column 1, line 21, for "shortended" read *shortened*; line 46, for "thhe" read *the*; column 7, line 69, after the word "contacting" insert *at*;

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*